(12) United States Patent
Ono

(10) Patent No.: US 8,223,244 B2
(45) Date of Patent: Jul. 17, 2012

(54) MODULATED LIGHT IMAGE CAPTURING APPARATUS, IMAGE CAPTURING METHOD AND PROGRAM

(75) Inventor: Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 360 days.

(21) Appl. No.: 12/568,236

(22) Filed: Sep. 28, 2009

(65) Prior Publication Data
US 2010/0073547 A1 Mar. 25, 2010

Related U.S. Application Data

(63) Continuation of application No. PCT/JP2008/055353, filed on Mar. 17, 2008.

(30) Foreign Application Priority Data

Mar. 26, 2007 (JP) ................................. 2007-079620
Dec. 27, 2007 (JP) ................................. 2007-338186

(51) Int. Cl.
*G02B 13/16* (2006.01)
*H04N 5/225* (2006.01)
(52) U.S. Cl. ........................................ 348/335; 359/558
(58) Field of Classification Search .................. 348/335, 348/345, 340; 359/11, 237, 558
See application file for complete search history.

(56) References Cited

U.S. PATENT DOCUMENTS

| 4,894,723 | A  * | 1/1990  | Takaiwa ....................... 348/230.1 |
| 2002/0094200 | A1 | 7/2002 | Yamaguchi |
| 2007/0247725 | A1 * | 10/2007 | Dowski et al. ................. 359/676 |
| 2010/0214438 | A1 * | 8/2010 | Hayashi et al. ............. 348/229.1 |

FOREIGN PATENT DOCUMENTS
JP 63-272182 A 11/1988
(Continued)

OTHER PUBLICATIONS

First Office Action, dated May 25, 2011, issued in corresponding CN Application No. 200880016542.0, 7 pages in English and Chinese.

(Continued)

*Primary Examiner* — Nelson D. Hernández Hernández
(74) *Attorney, Agent, or Firm* — Sughrue Mion, PLLC

(57) ABSTRACT

There is provided an image capturing apparatus including a light receiving section that receives light from an object, an optical system that passes the light from the object therethrough so as to cause the light receiving section to receive the light from the object, where the optical system includes an optical modulating section which causes an optical transfer function of the light from the object to remain substantially constant at a position where the light receiving section is provided on condition that an object distance of the object falls within a predetermined range in a direction parallel to an optical axis of the optical system, a diaphragm section that blocks at least partially the light from the object to be received by the light receiving section, a light quantity detecting section that detects a quantity of the light from the object, and an image capturing control section that, when the light quantity detected by the light quantity detecting section is smaller than a predetermined light quantity, (i) sets an aperture size of the diaphragm section so as to be larger than a predetermined value and (ii) causes the light receiving section to receive the light from the object at least part of which is modulated by the optical modulating section.

17 Claims, 14 Drawing Sheets

FOREIGN PATENT DOCUMENTS

| | | |
|---|---|---|
| JP | 11-500235 A | 1/1999 |
| JP | 2002-513951 A | 5/2002 |
| JP | 2002-218312 A | 8/2002 |
| JP | 2003-235794 A | 8/2003 |
| JP | 2005-354710 A | 12/2005 |
| JP | 2007-060647 A | 3/2007 |
| JP | 2008-017157 A | 1/2008 |
| WO | 2007/013621 A1 | 2/2007 |
| WO | 2007/074649 A1 | 7/2007 |

OTHER PUBLICATIONS

An Lian Sheng et al., "Applied Optics," Beijing Institute of Technology, second edition, Feb. 2000, pp. 163-169, 9 pages in Chinese.

Office Action, dated Jan. 10, 2012, issued in counterpart JP Application No. 2007-338186, 5 page in English and Japanese.

The Second Office Action, dated Feb. 15, 2012, issued in corresponding CN Application No. 200880016542.0, 19 pages in English and Chinese.

* cited by examiner

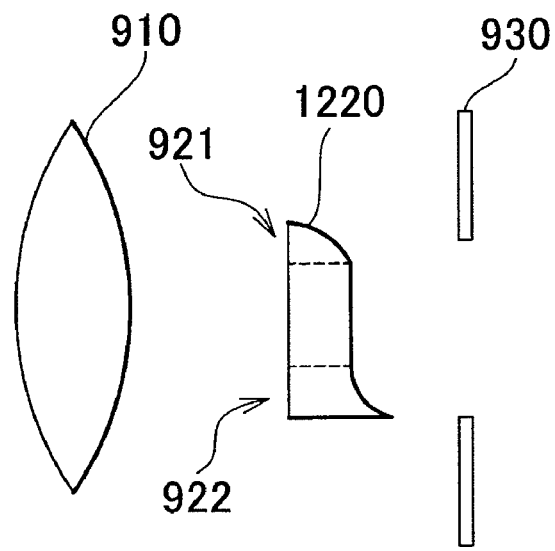
F I G . 12
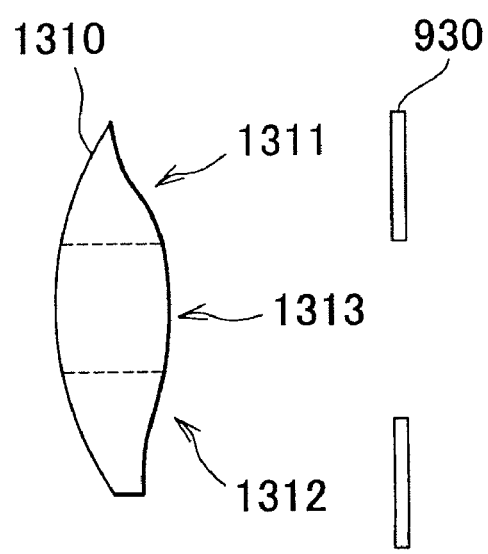
F I G . 13

145

| DIAPHRAGM APERTURE SIZE | CORRECTION PARAMETER |
|---|---|
| APERTURE SIZE 1 | NO CORRECTION PERFORMED |
| APERTURE SIZE 2 | INVERSE FILTER A |
| APERTURE SIZE 3 | INVERSE FILTER B |
| ⋮ | ⋮ |

| FOCAL LENGTH | DISTANCE RANGE 1 | DISTANCE RANGE 2 | DISTANCE RANGE 3 |
|---|---|---|---|
| fO1 | Z11-Z12 | Z13-Z14 | Z15-Z16 |
| fO2 | Z21-Z22 | Z23-Z24 | Z25-Z26 |
| ⋮ | ⋮ | ⋮ | ⋮ |

FIG. 15

MODULATED LIGHT IMAGE CAPTURING APPARATUS, IMAGE CAPTURING METHOD AND PROGRAM

The present application claims priority from Japanese Patent Applications No. 2007-079620 filed on Mar. 26, 2007 and No. 2007-338186 filed on Dec. 27, 2007 and PCT International Application No. PCT/JP2008/055353 filed on Mar. 17, 2008, the contents of which are incorporated herein by reference.

BACKGROUND

1. Technical Field

The present invention relates to an image capturing apparatus, an image capturing method, and a program. More particularly, the present invention relates to an image capturing apparatus and an image capturing method for capturing images, and to a program for use with the image capturing apparatus.

2. Related Art

A known optical mask causes the optical transfer function to remain essentially constant within some range from the in-focus position (for example, see Patent Documents 1 and 2). A known camera captures images by focusing optical radiation from an object onto an array with a point spread function (PSF) having an extent greater than twice the pitch of the array at an optimal focus of the objective optics (for example, see Patent Document 3).

[Patent Document 1] U.S. Pat. No. 5,748,371
[Patent Document 2] United States Patent Application Publication No. 2002/0118457
[Patent Document 3] PCT International Publication No. 04/063989

The techniques disclosed in Patent Documents 1 and 2 can increase the focal depth, but require significant restoration processing to be performed on the images. Such restoration processing necessarily involves an enormous amount of calculation, thereby hindering the attempts to improve the real-time characteristics of the image capturing. The camera disclosed in Patent Document 3 can identify defective pixels, for example, but can not achieve a large focal depth when capturing images.

SUMMARY

To solve the above-mentioned problems, a first embodiment of the present invention provides an image capturing apparatus including a light receiving section that receives light from an object, an optical system that passes the light from the object therethrough so as to cause the light receiving section to receive the light from the object, where the optical system includes an optical modulating section which causes an optical transfer function of the light from the object to remain substantially constant at a position where the light receiving section is provided on condition that an object distance of the object falls within a predetermined range in a direction parallel to an optical axis of the optical system, a diaphragm section that blocks at least partially the light from the object to be received by the light receiving section, a light quantity detecting section that detects a quantity of the light from the object, and an image capturing control section that, when the light quantity detected by the light quantity detecting section is smaller than a predetermined light quantity, (i) sets an aperture size of the diaphragm section so as to be larger than a predetermined value and (ii) causes the light receiving section to receive the light from the object at least part of which is modulated by the optical modulating section.

The optical modulating section may be movable relative to the optical axis of the optical system, and when the light quantity detected by the light quantity detecting section is smaller than the predetermined light quantity, the image capturing control section may (i) set the aperture size of the diaphragm section so as to be larger than the predetermined value and (ii) move the optical modulating section to a position which enables the light receiving section to receive the light from the object at least part of which has passed through the optical modulating section. When the aperture size of the diaphragm section is larger than the predetermined value, the optical modulating section may be positioned such that the light from the object passes through the optical modulating section.

A second embodiment of the present invention provides an image capturing method used by an image capturing apparatus. Here, the image capturing apparatus includes a light receiving section that receives light from an object, an optical system that passes the light from the object therethrough so as to cause the light receiving section to receive the light from the object, where the optical system includes an optical modulating section which causes an optical transfer function of the light from the object to remain substantially constant at a position where the light receiving section is provided on condition that an object distance of the object falls within a predetermined range in a direction parallel to an optical axis of the optical system, and a diaphragm section that blocks at least partially the light from the object to be received by the light receiving section. The image capturing method includes detecting a quantity of the light from the object, and when the light quantity detected in the light quantity detecting is smaller than a predetermined light quantity, (i) setting an aperture size of the diaphragm section so as to be larger than a predetermined value and (ii) causing the light receiving section to receive the light from the object at least part of which is modulated by the optical modulating section.

A third embodiment of the present invention provides a program for use with an image capturing apparatus. Here, the image capturing apparatus includes a light receiving section that receives light from an object, an optical system that passes the light from the object therethrough so as to cause the light receiving section to receive the light from the object, where the optical system includes an optical modulating section which causes an optical transfer function of the light from the object to remain substantially constant at a position where the light receiving section is provided on condition that an object distance of the object falls within a predetermined range in a direction parallel to an optical axis of the optical system, and a diaphragm section that blocks at least partially the light from the object to be received by the light receiving section. The program causes the image capturing apparatus to function as a light quantity detecting section that detects a quantity of the light from the object, and an image capturing control section that, when the light quantity detected by the light quantity detecting section is smaller than a predetermined light quantity, (i) sets an aperture size of the diaphragm section so as to be larger than a predetermined value and (ii) causes the light receiving section to receive the light from the object at least part of which is modulated by the optical modulating section Here, all the necessary features of the present invention are not listed in the summary. The sub-combinations of the features may become the invention.

The present invention can provide an image capturing apparatus which can achieve an increase in the focal depth, while reducing image restoration processing in some cases.

BRIEF DESCRIPTION OF THE DRAWINGS

FIG. 12 illustrates a further different exemplary configuration of the optical system 110.

FIG. 13 illustrates a further different exemplary configuration of the optical system 110.

FIG. 14 illustrates, as an example, data stored on a correction parameter storing section 145 by using a table.

FIG. 15 illustrates, as an example, data stored on a focal length storing section 190 by using a table.

DESCRIPTION OF EXEMPLARY EMBODIMENTS

Hereinafter, an embodiment of the present invention will be described. The embodiment does not limit the invention according to the claims, and all the combinations of the features described in the embodiment are not necessarily essential to means provided by aspects of the invention.

Figure 1:
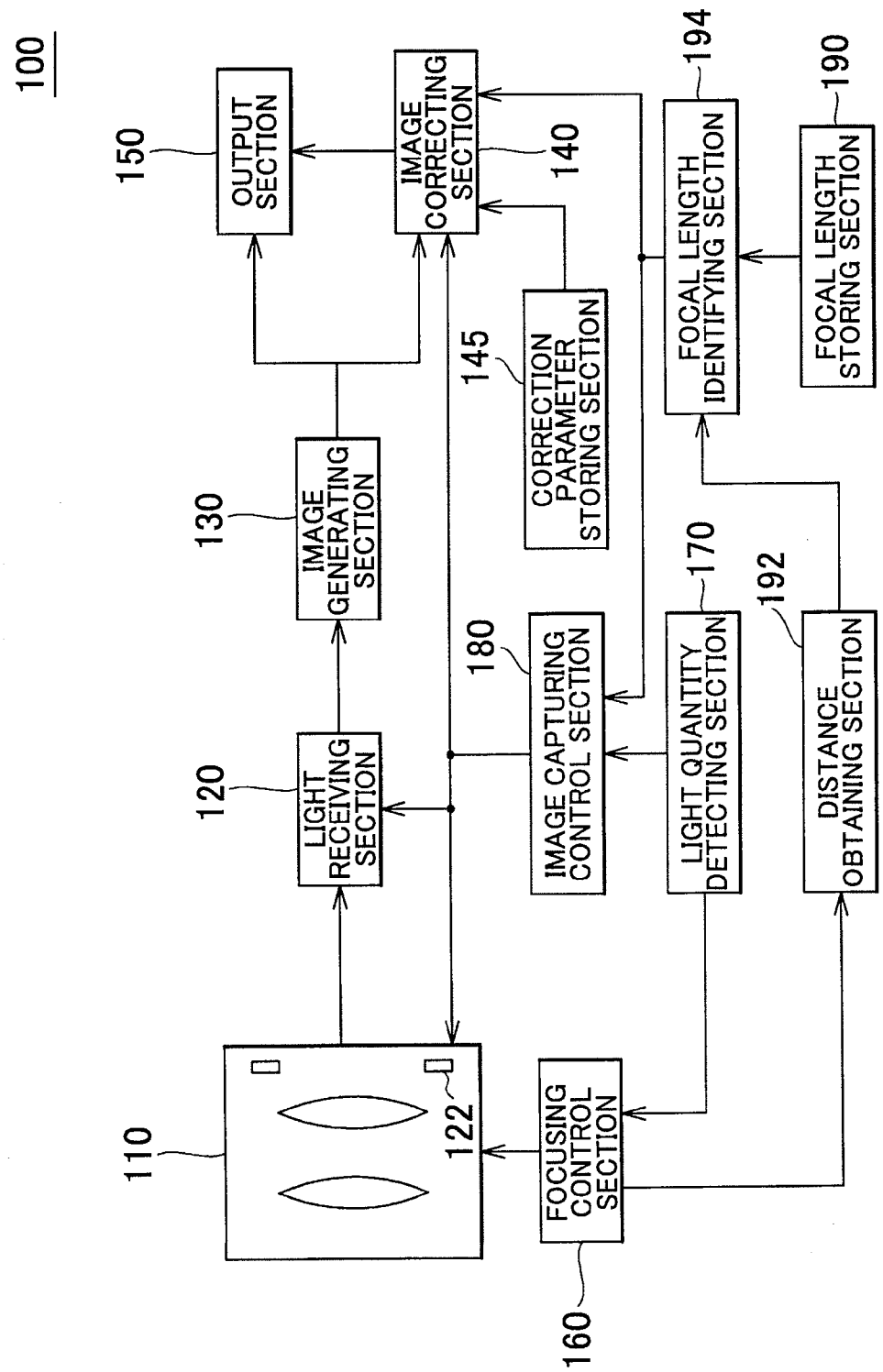
FIG. 1 illustrates an exemplary configuration of an image capturing apparatus 100.

FIG. 1 illustrates an exemplary block configuration of an image capturing apparatus 100 relating to an embodiment of the present invention. The image capturing apparatus 100 includes therein an optical system 110, a light receiving section 120, an image generating section 130, an image correcting section 140, a correction parameter storing section 145, an output section 150, a focusing control section 160, a light quantity detecting section 170, an image capturing control section 180, a focal length storing section 190, a distance obtaining section 192, and a focal length identifying section 194. The optical system 110 passes light therethough. The light receiving section 120 receives light from an object which has passed through the optical system 110. The image capturing apparatus 100 generates an image by capturing the image of the object.

The optical system 110 causes the optical transfer function of light from an object to remain substantially constant at the position where the light receiving section 120 is disposed, on condition that the object distance of the object falls within a predetermined range in the direction parallel to the optical axis of the optical system 110. To be specific, the optical system 110 includes an optical modulating section that modulates the phase of the light from the object in such a manner that the optical transfer function of the light from the object remains substantially constant on condition that the object distance of the object falls within the predetermined range. The optical characteristics of the optical system 110 are qualitatively described with reference to FIG. 2. A diaphragm section 122 included in the optical system 110 partially blocks the light from the object, and causes the light receiving section 120 to receive the remaining light. The light quantity detecting section 170 detects the quantity of the light from the object. When the light quantity detected by the light quantity detecting section 170 is smaller than a predetermined light quantity, the image capturing control section 180 sets the aperture size of the diaphragm section 122 so as to be larger than a predetermined value and causes the light receiving section 120 to receive the light from the object at least part of which is modulated by the optical modulating section. Specifically speaking, the image capturing control section 180 increases the aperture size of the diaphragm section 122 as the light quantity detected by the light quantity detecting section 170 decreases. As will be described later, the optical modulating section increases the degree at which light that passes through the optical modulating section is modulated as the distance from the optical axis to the region through which the light passes increases. In other words, the optical modulating section modulates the light from the object more significantly in the peripheral region thereof than in the region in the vicinity of the optical axis. Therefore, when the aperture size of the diaphragm section 122 is set larger than a predetermined value, the light that has passed through the optical modulating section causes the optical transfer function of the light from the object to remain substantially constant on condition that the object distance of the object falls within the predetermined range.

The light receiving section 120 has a plurality of light receiving elements arranged two-dimensionally. The image generating section 130 generates the image of the object by A/D converting the quantity of the light received by each of the plurality of light receiving elements. The image correcting section 140 corrects the image generated by the image generating section 130 based on the values obtained by A/D converting the light quantities, the positions of the light receiving elements, and the optical transfer function of the optical system 110. Specifically speaking, the correction parameter storing section 145 stores thereon, in association with each aperture size of the diaphragm section 122, a correction parameter that is determined by the optical transfer function of the optical system 110 when the diaphragm section 122 has the aperture size. The image correcting section 140 corrects the image generated by the image generating section 130 with the use of the correction parameter stored on the correction parameter storing section 145 in association with the aperture size of the diaphragm section 122 which is controlled by the image capturing control section 180. The output section 150 displays thereon the image obtained as a result of the correction done by the image correcting section 140. The output section 150 also displays thereon the image generated by the image generating section 130. The output section 150 may be a display which enables a user to view the image captured by the image capturing apparatus 100.

Figure 2:
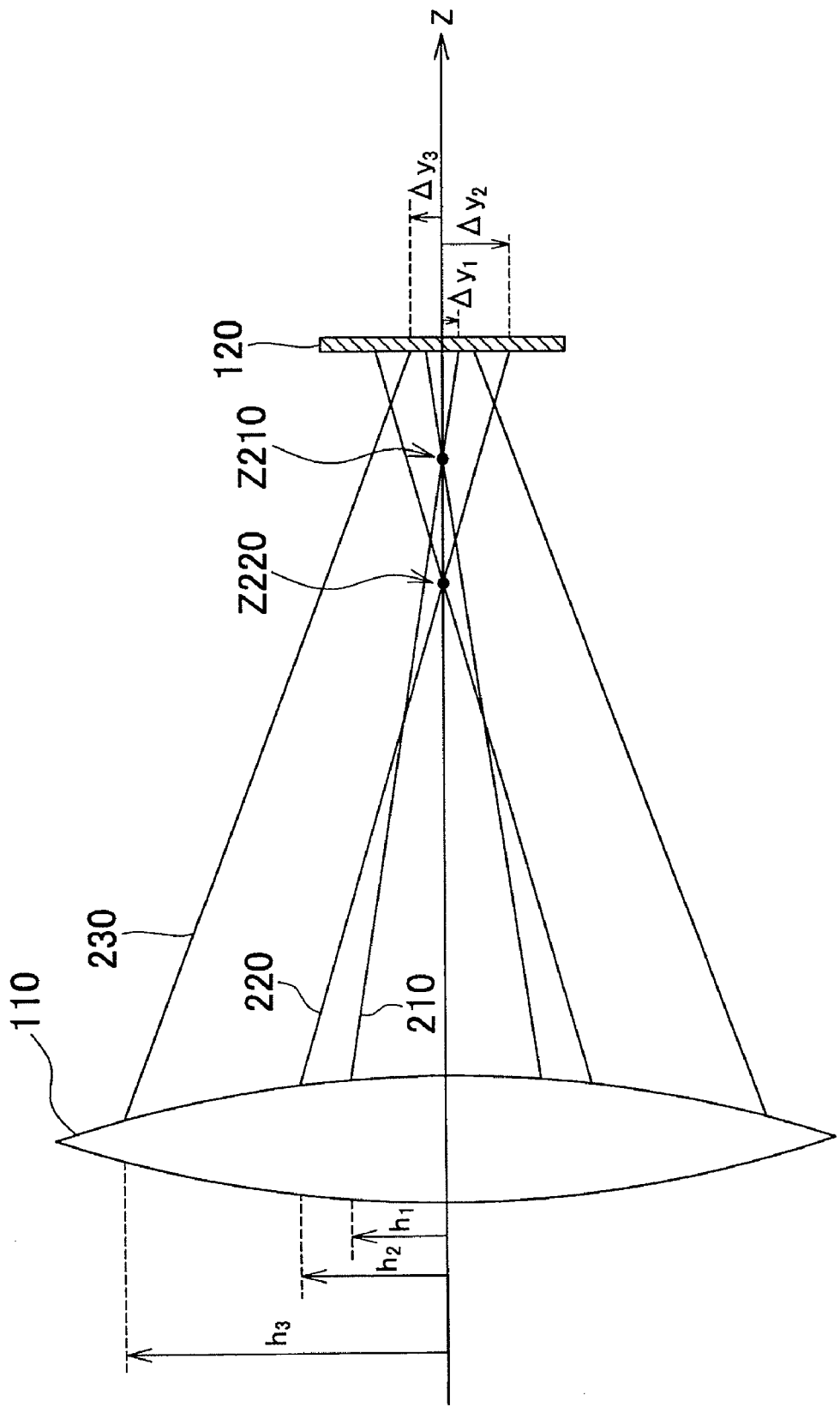
FIG. 2 is a schematic view illustrating, as an example, the optical characteristics of an optical system 110.

FIG. 2 is a schematic view illustrating, as an example, the optical characteristics of the optical system 110. The optical system 110 forms an image at a position Z210 which is positioned between the optical system 110 and the light receiving section 120 in the direction parallel to the optical axis, by using a light ray 210 which is incident on the optical system 110 at a height of h1. The light ray 210 is received by the light receiving section 120 at a position lower than the optical axis by a distance Δy1. Therefore, the transverse aberration of the light ray 210 in the optical system 110 is represented by a negative value. The optical system 110 forms an image at a position Z220 which is closer to the optical system 110 than the position Z210 is in the direction parallel to the optical axis, by using a light ray which is incident on the optical system 110 at a height of h2 that is larger than the height h1. The light ray 220 is received by the light receiving section 120 at a position lower than the optical axis by a distance Δy2 that is larger than the distance Δy1.

Here, note that the optical system 110 causes the light receiving section 120 to receive the light ray that is incident on the optical system 110 at a height of h3 that is larger than the height h2 at a position higher than the optical axis by a distance Δy3. In other words, with the optical system 110, the value of the transverse aberration decreases as the incident height increases with respect to the optical axis, but the transverse aberration takes a local minimal value when the incident height reaches a certain value. As the incident height further increases from the certain value, the transverse aberration increases, and the transverse aberration reaches zero when the incident height reaches a different certain value. As the incident height further increases from the different certain value, the transverse aberration exceeds zero.

The light receiving section 120 forms a substantially planar light receiving surface with the plurality of light receiving elements. The light receiving surface of the light receiving section 120 is placed so as to be substantially perpendicular to the optical axis of the optical system 110. The light receiving elements may be CCD or MOS imaging elements.

In the above part, the optical characteristics of the optical system 110 are qualitatively described with reference to FIG. 2. Note that the schematic view of FIG. 2 illustrating the optical system 110 and the light receiving section 120 is only intended to facilitate the understanding of the optical characteristics of the optical system 110. Therefore, the sizes in the schematic view do not reflect the actual scale.

Figure 3:
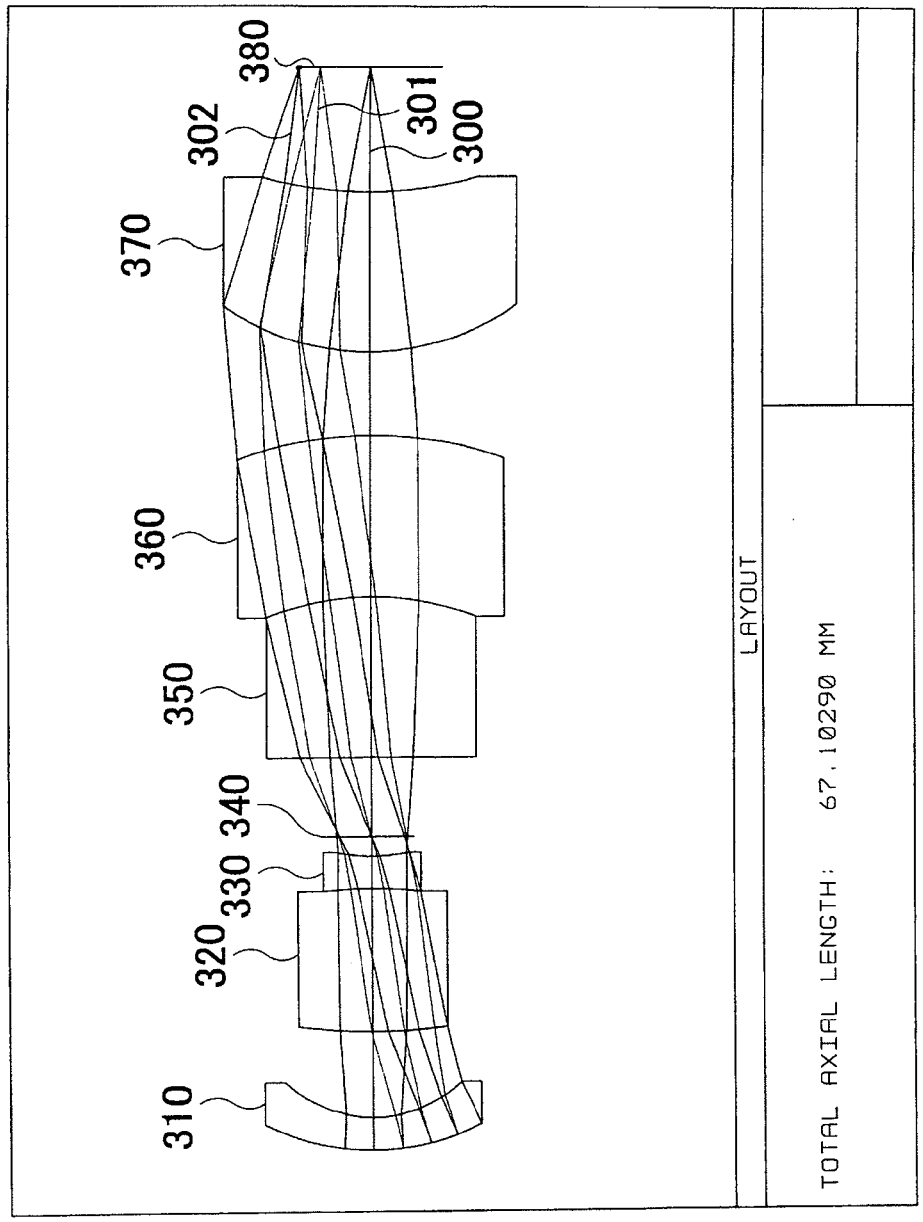
FIG. 3 illustrates an exemplary structure of the optical system 110.

FIG. 3 illustrates an exemplary structure of the optical system 110. The optical system 110 includes a plurality of optical elements 310, 320, 330, 350, 360 and 370 and a diaphragm 340. The diaphragm 340 is shown as an example of the diaphragm section 122. The light receiving surface of the light receiving section 120 is shown as an image plane 380 in FIG. 3. FIG. 3 illustrates three main light rays 300, 301, and 302 in the state of overlapping the optical system 110. Note that FIGS. 4, 5 and 6 mentioned later illustrate the optical characteristics of the optical system 110 associated with light having a wavelength of 0.5876 nm which is represented by the main light rays 300, 301 and 302. The following describes the optical data of the optical elements 310, 320, 330, 350, 360 and 370.

The optical element 310 has a refractive index of 1.66445663 and has a thickness of 1.997163 mm. The curvature and radius of the optical element 310 are respectively 15.20834 mm and 13.47915 mm on the side of the object, and respectively 8.153898 mm and 10.99605 mm on the side of the light receiving section 120. When mentioned in the description of FIG. 3, the thickness of the optical element indicates the length of the optical element in the direction parallel to the optical axis.

The optical element 320 is positioned spaced from the optical element 310 by a distance of 5.193977 mm in the optical axis direction so as to be closer to the image plane 380 than the optical element 310 is. Here, the distance indicates the distance from the surface of the optical element 310 which faces the image plane 380 to the surface of the optical element 320 which faces the object. When mentioned in the following description of FIG. 3, the distance between the optical elements indicates a similarly defined distance. The optical element 320 has a refractive index of 1.92285059 and a thickness of 8.880505 mm. The curvature and radius of the optical element 320 are respectively 38.38834 mm and 9.300722 mm on the side of the object, and respectively −28.17275 mm and 6.105449 mm on the side of the image plane 380.

The optical element 330 is provided so as to be in contact with the optical element 320. The optical element 330 has a refractive index of 1.46449858 and a thickness of 1.99997 mm. The curvature and radius of the optical element 330 are respectively 10.8814 mm and 4.69059 mm on the side of the image plane 380. The diaphragm 340 is positioned spaced from the optical element 330 by a distance of 1.245339 mm in the optical axis direction so as to be closer to the image plane 380 than the optical element 330 is. The diaphragm 340 has a radius of 4.432406 mm.

The optical element 350 is positioned spaced from the diaphragm 340 by a distance of 4.864987 mm in the optical axis direction so as to be closer to the image plane 380 than the diaphragm 340 is. The optical element 350 has a refractive index of 2.02203350 and a thickness of 10.00014 mm. The curvature and radius of the optical element 350 are respectively −443.0356 mm and 8.913335 mm on the side of the object, and respectively −17.46664 mm and 13.00595 mm on the side of the image plane 380.

The optical element 360 is provided so as to be in contact with the optical element 350. The optical element 360 has a refractive index of 1.50012841 and a thickness of 10.13764 mm. The curvature and radius of the optical element 360 are respectively −23.90391 mm and 16.52799 mm on the side of the image plane 380.

The optical element 370 is positioned spaced from the optical element 360 by a distance of 5.136917 mm in the optical axis direction so as to be closer to the image plane 380 than the optical element 360 is. The optical element 370 has a refractive index of 2.02203350 and a thickness of 9.916248 mm. The curvature and radius of the optical element 370 are respectively 15.68482 mm and 18.15194 mm on the side of the object, and respectively 25.22519 mm and 13.3875 mm on the side of the image plane 380. The image plane 380 is positioned away from the optical element 370 by a distance of 7.73001 mm.

Figure 4:
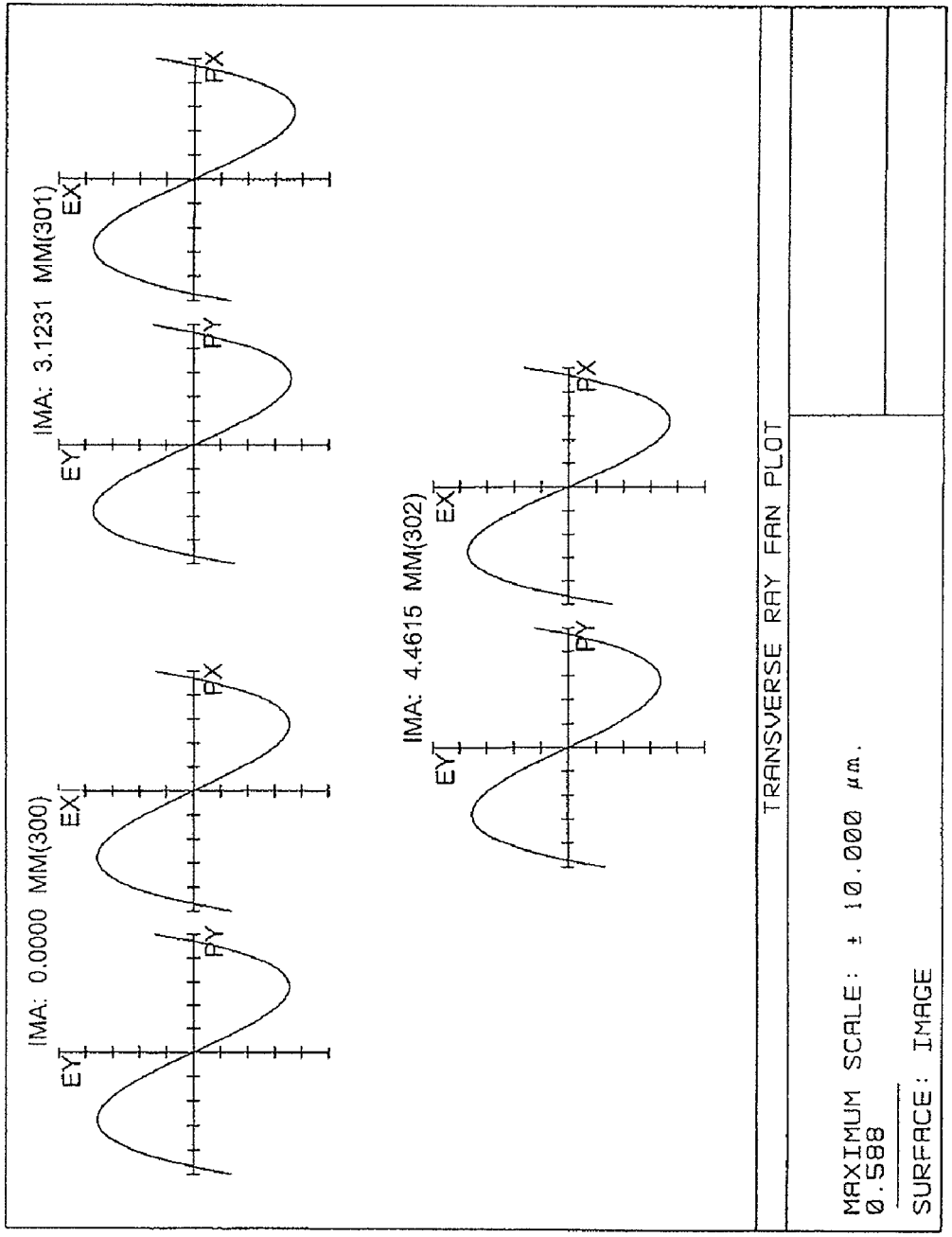
FIG. 4 illustrates transverse aberration characteristics of the optical system 110.

FIG. 4 illustrates the transverse aberration characteristic of the optical system 110. As illustrated in FIG. 4, the optical system 110 has substantially the same transverse aberration characteristic in the X and Y directions, in association with a plurality of different image heights. Such a transverse aberration characteristic can be achieved by way of a designing method which produces substantially the same transverse aberration characteristics. In this designing method, the transverse aberration characteristic is represented by a cubic function. Specifically speaking, the transverse aberration characteristic is represented by a function $\Delta y = ax^3 - ab^2 x$, where the coefficients a and b are constants. The targeted values of the coefficients a and b are respectively set at $5 \times 10^{-4}$ and 10, for example.

In this designing method, the targeted value of the X coordinate at which the transverse aberration takes an extremal value is defined by the coefficient b, and the targeted value of the extremal value is defined by the coefficient a, as explained later. The absolute value of the extremal value may be designated by the coefficient a in accordance with the pitch of the light receiving elements in the light receiving section 120, so that the absolute value of the transverse aberration at the image plane 380 is at least larger than the pitch of the light receiving elements in the light receiving section 120. The transverse aberration characteristic is calculated for each light ray having a particular image height while the parameters of the respective optical elements constituting the optical system 110 are varied. Here, the parameters of the respective optical elements are varied until the difference between the calculated transverse aberration characteristic and a predetermined transverse aberration characteristic becomes smaller than a predetermined difference. Note that the function representing the transverse aberration characteristic is not limited to the above-mentioned tertiary expression, and may be any function which is symmetrical with respect to the point of origin and has an extremal value, for example, a sine function.

As illustrated in FIG. 2, the absolute value of the transverse aberration of the optical system 110 is 0 in the case of x=0. As the X coordinate varies in the positive direction, the absolute value of the transverse aberration increases until reaching the extremal value. The curve representing the transverse aberration is substantially symmetrical with respect to the point of origin. Which is to say, the incident position, which is positioned on the entrance pupil of the optical system 110, and the transverse aberration of the light ray which is incident on the optical system 110 at the incident position have the following relation therebetween. When the incident position varies within a range defined by the optical axis and a first incident position that is separated from the optical axis by a first distance, the absolute value of the transverse aberration increases as the distance from the optical axis to the incident position increases. The transverse aberration varies in accordance with the variation in the incident position substantially symmetrically with respect to the optical axis. The incident position, which is positioned on the entrance pupil of the optical system 110, and the transverse aberration of the light ray which is incident on the optical system 110 at the incident position also has the following relation. The transverse aberration varies continuously in accordance with the variation in the distance from the optical axis to the incident position.

Also as illustrated in FIG. 2, when the X coordinate further increases from the X coordinate at which the transverse aberration takes the extremal value, the absolute value of the transverse aberration does not increase any more and starts decreasing. As the X coordinate keeps increasing, the absolute value of the transverse aberration reaches zero, and then starts increasing. As described above, the absolute value of the differential value of the transverse aberration determined by the incident position is smaller when the incident position is somewhere from the optical axis to the first incident position than when the incident position is in the vicinity of the optical axis. Specifically speaking, the differential value of the transverse aberration determined by the incident position is zero when the incident position is the first incident position. When the incident position varies within the range from the first incident position to a second incident position which is separated away from the optical axis by a second distance that is larger than the first distance, the absolute value of the transverse aberration decreases as the distance from the optical axis to the incident position increases.

The transverse aberration is zero for the light ray which is incident on the optical system 110 at the second incident position. When the incident position varies within the range from the second incident position to a third incident position which is separated from the optical axis by a third distance that is larger than the second distance, the absolute value of the transverse aberration increases as the distance from the optical axis to the incident position increases. As mentioned above in relation to the designing method, the transverse aberration of the optical system 110 is represented by a cubic function of the distance from the optical axis to the incident position. Other than the above-mentioned cubic function, the transverse aberration of the optical system 110 may be represented by a sine function of the distance from the optical axis to the incident position.

Figure 5:
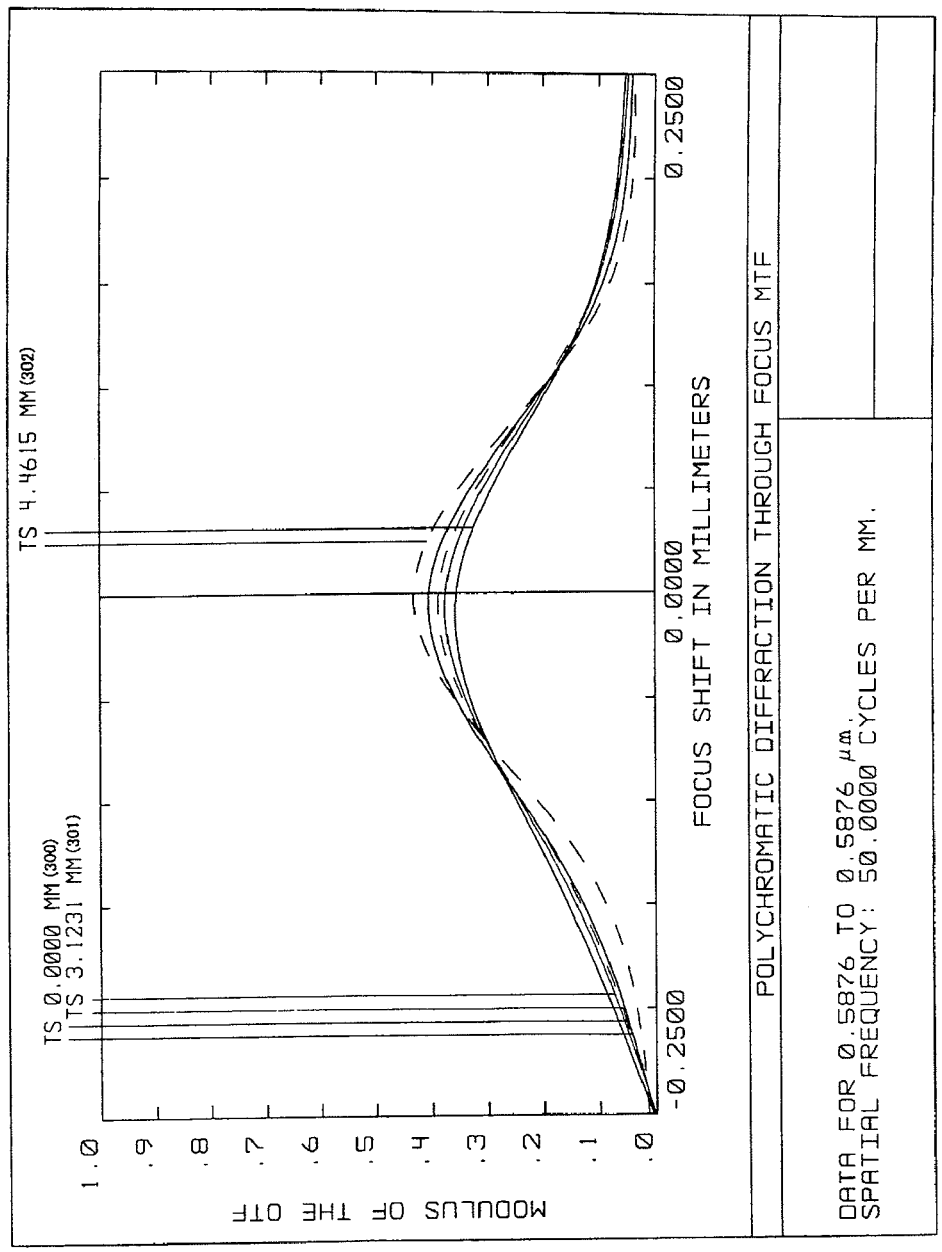
FIG. 5 illustrates MTF characteristics of the optical system 110.
Figure 6:
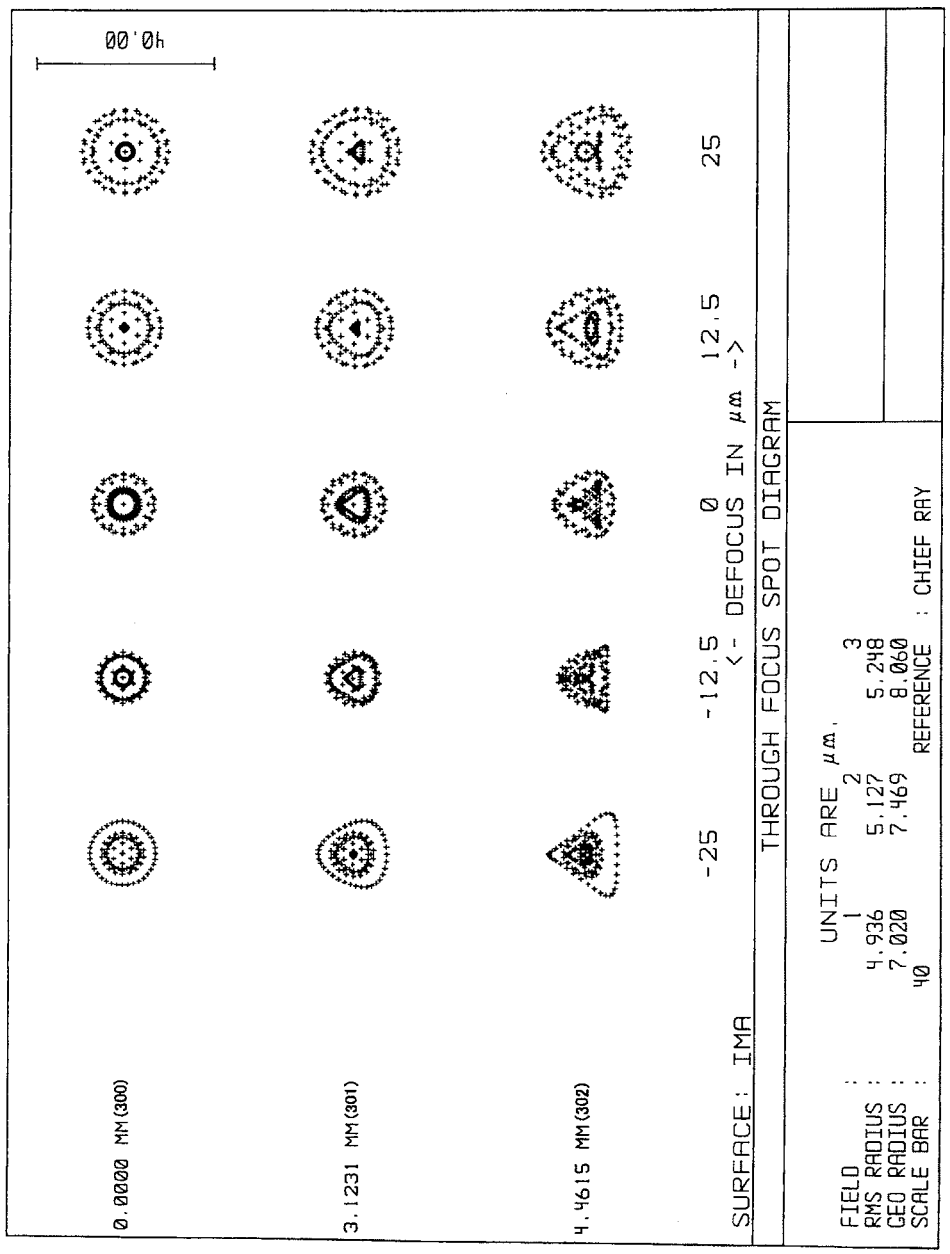
FIG. 6 illustrates spot diagrams for the optical system 110.

FIG. 5 illustrates the MTF characteristic of the optical system 110. In FIG. 5, the horizontal axis represents the defocusing quantity from the image plane 380 in the direction parallel to the optical axis, and the vertical axis represents the MTF value. FIG. 6 illustrates exemplary spot diagrams for the optical system 110. The MTF characteristic shown in FIG. 5 and the spot diagrams illustrated in FIG. 6 are obtained in association with an image having a spatial frequency of 50 lines/mm.

As is indicated by FIG. 5, the optical system 110 has substantially the same MTF distribution in association with a plurality of different image heights, irrespective of whether the light ray is a sagittal or meridional ray. FIG. 5 also shows that the optical system 110 has an MTF value equal to or higher than a predetermined value (for example, 0.2) in association with a large range of the defocusing quantity. FIG. 6 illustrates the spot diagrams for the optical system 110 arranged with the defocusing quantity being plotted along the horizontal axis and the image height being plotted along the vertical axis. FIG. 6 indicates that the spot diagrams have substantially the same spread when the defocusing quantity and the image height fall within the respective predetermined ranges. As implied by the above, the optical system 110 has substantially the same optical transfer function when the defocusing quantity and the image height fall within the respective predetermined ranges. For this reason, the image correcting section 140 can easily restore the image formed by the light which has passed through the optical system 110 and is received by the light receiving section 120, with the use of substantially the same inverse filter.

Figure 7:
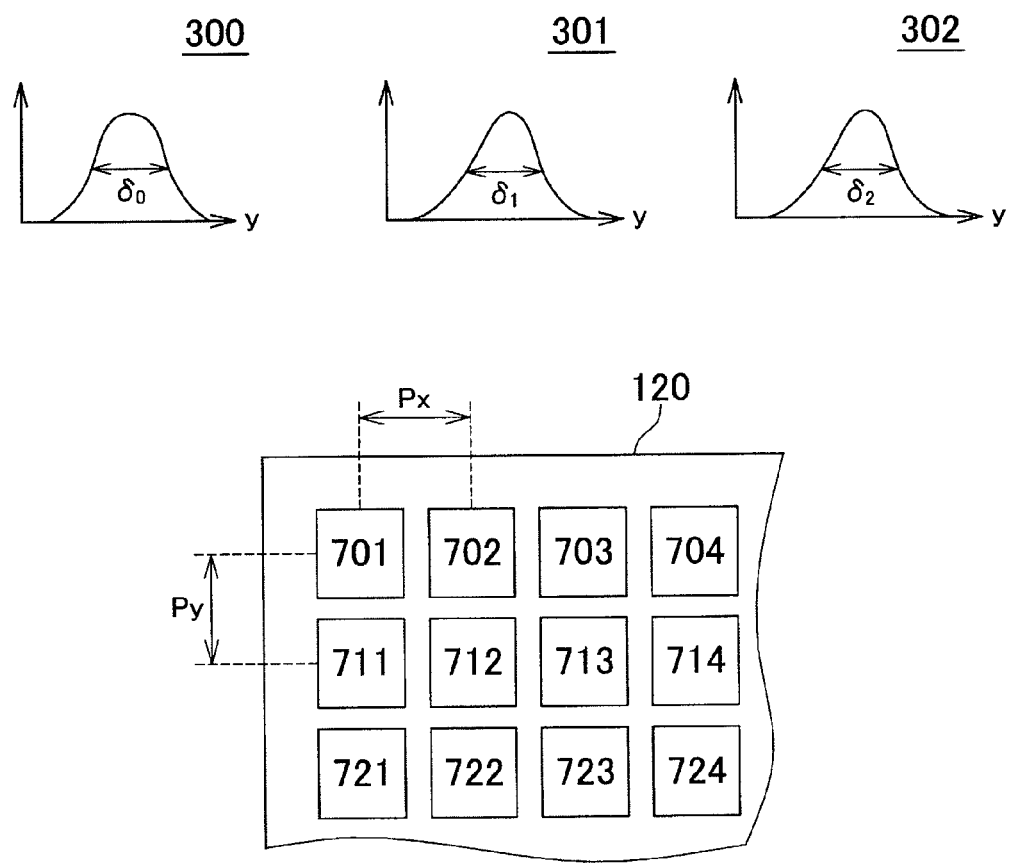
FIG. 7 illustrates the response of the optical system 110 to a point light source.

FIG. 7 illustrates exemplary responses of the optical system 110 to a point light source, and exemplary arrangement of the light receiving elements constituting the light receiving section 120. As stated above, the optical system 110 provides substantially the same spread for a plurality of different image heights. Therefore, as long as the light receiving section 120 is positioned within the predetermined range of the defocusing quantity, the half bandwidths $\delta 0$, $\delta 1$, and $\delta 2$ of the responses of the optical system 110 to the point light source can be made substantially the same as each other as illustrated in FIG. 7. A range of the defocusing quantity which enables the half bandwidths $\delta 0$, $\delta 1$, and $\delta 2$ to be substantially the same as each other can be controlled by designating the targeted value of the X coordinate at which the transverse aberration takes the extremal value in the above-mentioned designing method. For example, such a range of the defocusing quantity is controlled, for example, by the value of the coefficient b in the function $\Delta y = ax^3 - ab^2 x$ representing the transverse aberration.

The light receiving section 120 includes therein a plurality of light receiving elements 701 to 704, 711 to 714, 721 to 724, .... The light receiving elements constituting the light receiving section 120 are arranged at regular intervals at a pitch of Px in the x direction and at a pitch of Py in the y direction. Here, during the designing process of the optical system 110, the transverse aberration characteristic of the optical system 110 may be designated such that the half bandwidths $\delta 0$, $\delta 1$, and $\delta 2$ of the responses are larger than the pixel pitches Px and Py. To be specific, when the transverse aberration characteristic is given by $\Delta y = ax^3 - ab^2 x$ in the above designing method, the targeted value of the coefficient a is determined in such a manner that the half bandwidths $\delta 0$, $\delta 1$, and $\delta 2$ of the responses are larger than both of the pitches Px and Py. As discussed above, when the optical system 110 is designed, the targeted value of the coefficient b is determined in accordance with the permissible range of the defocusing quantity and the targeted value of the coefficient a is determined in accordance with the pixel pitches of the light receiving elements constituting the light receiving section 120.

In a case where the image capturing apparatus 100 captures color images, a light receiving element may receive light having a wavelength corresponding to a different color from its adjacent light receiving elements. If such is the case, the pixel pitch may indicate the distance between the light receiving elements that receive the light having the wavelength corresponding to the same color. For example, when the light receiving elements 701, 703, 712, 714, 721, and 723 receive light having a wavelength corresponding to green, the light receiving elements 702, 704, 722, and 724 receive light having a wavelength corresponding to blue, and the light receiving elements 711 and 713 receive light having a wavelength corresponding to red, the pixel pitch in the y direction may indicate the distance between the central position of the light receiving element 701 and the central position of the light receiving element 721, and the pixel pitch in the x direction may indicate the distance between the central position of the light receiving element 701 and the central position of the light receiving element 703.

The light receiving section 120 may be positioned between the paraxial image point of the optical system 110 and the intersection at which a light ray which is incident on the optical system 110 at the first incident position in parallel to the optical axis intersects with the optical axis. To be more specific, the light receiving section 120 may be positioned in the vicinity of the middle point between the above intersection and the paraxial image point of the optical system 110.

The image correcting section 140 corrects the image obtained based on the quantity of the light received by the light receiving section 120, in accordance with the relation between the incident position and the transverse aberration. To be more specific, the image correcting section 140 subjects the image generated by the image generating section 130 to the restoration processing performed with the use of an inverse filter that causes the optical transfer function of the optical system 110 to be substantially the same as an ideal optical transfer function.

The output section 150 may display thereon the image obtained based on the quantity of the light received by the light receiving section 120. Specifically speaking, the output section 150 displays thereon the image generated by the image generating section 130. When the number of pixels of the output section 150 is smaller than the number of light receiving elements in the optical system 110, the output section 150 may discard some of the pixels and display the resulting image, instead of spatially averaging the image generated by the image generating section 130. The image capturing apparatus 100 may not need an optical low-pass filter for spatially spreading the light from the object.

As described above, the optical system 110 can cause the optical transfer function of light from an object to remain substantially constant at the position where the light receiving section 120 is provided on condition that the object distance of the object falls within the predetermined range in the direction parallel to the optical axis. The optical modulating section in the optical system 110 may be realized by a partial region of the optical system 110. For example, the optical modulating section may be realized by a region of the optical system 110 which causes the absolute value of the transverse aberration to be larger than a predetermined value and which does not intersect with the optical axis. In this case, the optical modulating section may be positioned such that the light from the object passes through the optical modulating section when the aperture size of the diaphragm section 122 is larger than a predetermined value. The optical characteristics of the optical modulating section of the optical system 110 makes it possible to cause the optical transfer function of light from an object to remain substantially constant at the position where the light receiving section 120 is provided on condition that the object distance of the object falls within the predetermined range in the direction parallel to the optical axis.

The following describes the image capturing operation for capturing the image of the object with the use of the image capturing apparatus 100 utilizing therein the optical system 110 described with reference to FIGS. 1 to 7. As has been described, the optical system 110 can increase the focal depth. To further reduce the errors in the image obtained by the restoration processing performed by using the inverse filter, however, it is more preferable to adjust the focal length of the optical system 110 in accordance with the distance between the optical system 110 and the main object. The focusing control may be performed, for example, in such a manner that the image capturing apparatus 100 may capture preliminary images while varying the focal length so as to identify a focal length which maximizes the contrast of the preliminary images. However, the optical system 110 causes the image capturing apparatus 100 to produce blurry images of the object, which have a low contrast value. Therefore, it may be difficult to identify the focal length which maximizes the contrast of the preliminary images.

When performing the focusing control by using the above-described optical system 110, the image capturing apparatus 100 may perform the focusing control with an optical element that has such a transverse aberration characteristic as to offset the transverse aberration characteristic of the optical system 110 being inserted thereto. This focusing control method according to which an optical element that compensates the optical characteristics of the optical system 110 is inserted into the image capturing apparatus 100 is exemplified and explained later.

When the light quantity detected by the light quantity detecting section 170 is larger than a predetermined light quantity, the image capturing apparatus 100 can perform the focusing control by reducing the aperture size of the diaphragm 340 to decrease the blurring effects realized by the optical system 110. In other words, the focusing control section 160 reduces the aperture size of the diaphragm 340, so as to cause the light receiving section 120 to receive the light that has passed through a region of the optical system 110 which causes the absolute value of the transverse aberration to be smaller than a predetermined value, intersects with the optical axis and is positioned in the vicinity of the intersection. Under this condition, the focusing control section 160 causes the light receiving section 120 to receive the light from the object, while varying the focal length. In the above-described manner, the focusing control section 160 designates, as the focal length at which the main object is focused, the focal length which maximizes the contrast of the preliminary images generated by the image generating section 130. Here, note that the focal depth increases as the aperture size of the diaphragm 340 decreases. Therefore, the focusing control section 160 may preferably increase the range of the focal lengths from which such a focal length that maximizes the value of the contrast and also causes the value of the contrast to be larger than a predetermined value is identified, as the aperture size of the diaphragm 340 decreases.

When the focusing control section 160 completes the focusing control operation, the image capturing control section 180 determines the aperture size of the diaphragm 340 based on the light quantity detected by the light quantity detecting section 170. Here, the image capturing control section 180 increases the aperture size of the diaphragm 340 as the light quantity detected by the light quantity detecting section 170 decreases. According to the above-described transverse aberration characteristic of the optical system 110, as the aperture size of the diaphragm 340 increases, the blurring realized by the optical system 110 in the direction parallel to the optical axis increases. For these reasons, when the optical system 110 is used, a large quantity of the light from the object enables the image generating section 130 to generate relatively clear images and the output section 150 can output the images generated by the image generating section 130. On the other hand, when the quantity of the light from the object is small, the optical system 110 gives, to the images of the object, the blurring effects in the direction parallel to the optical axis. Therefore, the above-mentioned correction to be done by the image correcting section 140 can produce relatively clear images.

Figure 8:
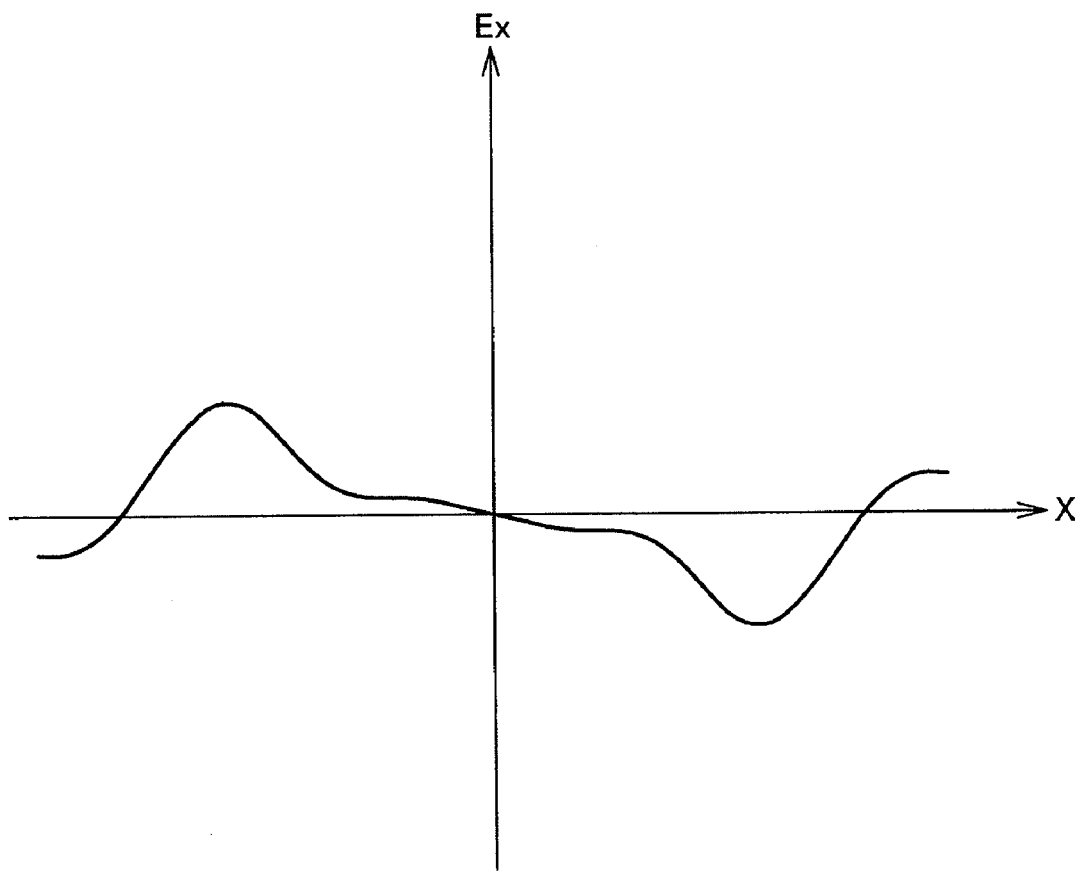
FIG. 8 illustrates different exemplary transverse aberration characteristics of the optical system 110.

FIG. 8 illustrates different exemplary transverse aberration characteristics of the optical system 110. When compared with the transverse aberration characteristics shown in FIG. 4, the transverse aberration characteristics shown in FIG. 8 is flat, specifically speaking, the absolute value of the transverse aberration is small within a predetermined range from the optical axis. Therefore, when compared with the case where the optical system 110 has the transverse aberration characteristics shown in FIG. 4, the focusing control can be performed more easily by using the light which passes through the region of the optical system 110 which causes the absolute value of the transverse aberration to be smaller than a predetermined value in a case where the optical system 110 has the transverse aberration characteristics shown in FIG. 8. As the x coordinate moves away from the point of origin, the absolute value of the transverse aberration gradually increases, reaches the local maximal value, and then decreases. This implies that the optical system 110 having the transverse aberration characteristics shown in FIG. 8 can also produce the blurring effects. Therefore, when the light quantity detected by the light quantity detecting section 170 is larger than a predetermined value, the focusing control section 160 performs the focusing control by controlling the aperture size of the diaphragm so as to use the region of the optical system 110 which causes the absolute value of the transverse aberration to be smaller than a predetermined value.

That is to say, the degree at which the light that is incident on the entrance pupil of the optical system 110 at the incident position which is separated from the optical axis by a distance larger than the first distance is modulated as a result of passing through the optical modulating section is larger than the degree at which the light that is incident on the entrance pupil of the optical system 110 at the incident position positioned between the optical axis and the first incident position that is separated from the optical axis by the first distance is modulated as a result of passing through the optical modulating section. Here, the incident position, which is positioned on the entrance pupil of the optical system 110, and the transverse aberration for the light ray which is incident on the entrance pupil of the optical system 110 at the incident position and passes through the optical modulating section have the following relation therebetween. When the incident position is positioned within the range from the first incident position that is separated from the optical axis by the first distance to the second incident position that is separated from the optical axis by the second distance larger than the first distance, the absolute value of the transverse aberration increases as the distance from the optical axis to the incident position increases. Here, the optical modulating section may include a region of the optical system 110 which causes the transverse aberration to be smaller than a predetermined value and which intersects with the optical axis. In the above-described manner, the degree at which the light is modulated as a result of passing through the predetermined region of the optical modulating section which includes the optical axis can be made smaller than the degree at which the light is modulated as a result of passing through a different region of the optical modulating section from the predetermined region.

As illustrated in FIG. 8, the differential value of the transverse aberration associated with an incident position in the vicinity of the second incident position may be zero. When the incident position falls within the range from the second incident position to the third incident position that is separated from the optical axis by the third distance larger than the second distance, the absolute value of the transverse aberration decreases as the distance from the optical axis to the incident position increases. Here, the transverse aberration is zero for the light ray that is incident on the entrance pupil of the optical system 110 at the third incident position. When the incident position falls within the range from the third incident position to a fourth incident position that is separated from the optical axis by a fourth distance larger than the third distance, the absolute value of the transverse aberration increases as the distance from the optical axis to the incident position increases. The optical system 110 having the characteristics shown in FIG. 8 is more preferable to the optical system having the transverse aberration characteristics shown in FIG. 4, in particular, when it is more important to perform the focusing control easily than to achieve uniform blurring effects.

Figure 9:
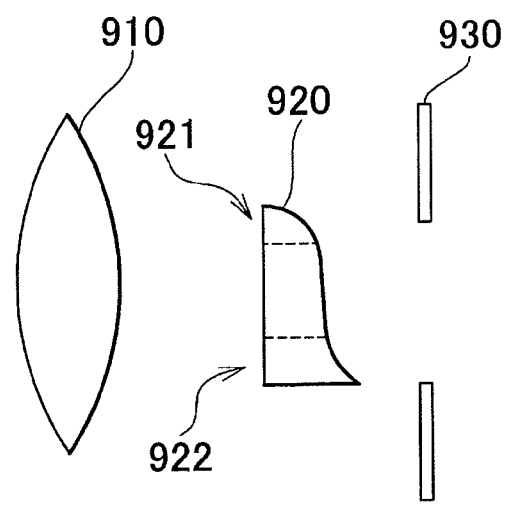
FIG. 9 illustrates a different exemplary configuration of the optical system 110.

FIG. 9 illustrates a different exemplary configuration of the optical system 110. The optical system 110 shown in FIG. 9 includes a lens 910, an optical modulating section 920 and a diaphragm section 930. The optical modulating section 920 causes the optical transfer function of light from an object to be substantially constant at the position where the light receiving section 120 is positioned on condition that the object distance of the object falls within the predetermined range in the direction parallel to the optical axis. The optical modulating section 920 has a shape represented, for example, by $z=k(x^3+y^3)$. The optical modulating section 920 having such a shape generates a phase shift of $P(x, y)=\exp(j\alpha(x^3+y^3))$ in the phase of the light that passes through the optical modulating section 920. This phase shift decreases the variation in the optical transfer function which is caused by the variation in the quantity of defocusing.

The optical modulating section 920 may be configured movable with respect to the optical axis of the optical system 110. The focusing control section 160 performs the focusing control after moving the optical modulating section 920 so that the optical modulating section 920 is temporarily positioned such that the light from the object does not pass through the optical modulating section 920. After the focusing control section 160 completes the focusing control, the image capturing control section 180 moves the optical modulating section 920 back to the original position and then causes the light receiving section 120 to receive the light from the object. Which is to say, with the optical modulating section 920 being positioned such that the light that has passed through the optical modulating section 920 is not received by the light receiving section 120, the focusing control section 160 causes the light receiving section 120 to receive the light from the object while varying the positional relation between the in-focus position and the light receiving section 120. In this manner, the focusing control section 160 performs the focusing control with reference to the quantity of the light received by the light receiving section 120. While the focusing control section 160 maintains the object to be focused, the image capturing control section 180 moves the optical modulating section 920 so as to position the optical modulating section 920 such that the light from the object passes through the optical modulating section 920 and is then received by the light receiving section 120, and captures the images of the object. When the light quantity detected by the light quantity detecting section 170 is smaller than a predetermined light quantity, the image capturing control section 180 may set the aperture size of the diaphragm section 122 so as to be larger than a predetermined value and position the optical modulating section 920 such that the light receiving section 120 can receive the light from the object at least part of which has passed through the optical modulating section 920.

Figure 10:
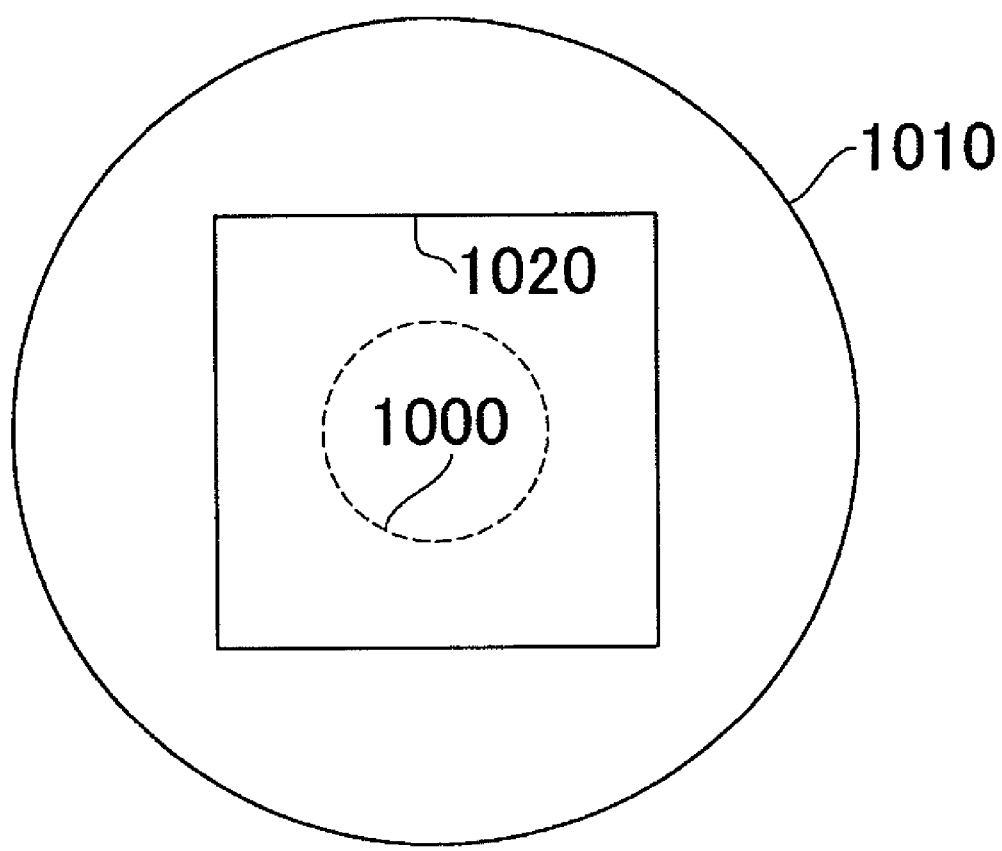
FIG. 10 illustrates the optical system 110 as seen from the object.

FIG. 10 illustrates the optical system 110 shown in FIG. 9 as seen from the object. The periphery 1010 of the lens 910 is positioned more outside than the periphery 1020 of the optical modulating section 920. When the aperture size of the diaphragm section 930 is controlled so that the light from the object which passes along the periphery 1020 of the optical modulating section 920 passes along the edge of the diaphragm section 930 (this aperture size of the diaphragm section 930 is referred to as a first aperture size), the light from the object is modulated by the optical modulating section 920 and reaches the light receiving section 120 in the state of being modulated. When the aperture size of the diaphragm section 930 is set larger than the first aperture size, part of the light from the object passes through the lens 910 but does not pass through the optical modulating section 920. Thus, the part of the light from the object reaches the light receiving section 120 in the state of not being modulated. Having not passed through the optical modulating section 920, the partial light can be used to detect the contrast during the focusing control.

As discussed above, when the aperture size of the diaphragm section 930 is equal to or lower than the predetermined first aperture size, the light receiving section 120 receives the light from the object which has passed through the optical modulating section 920 but does not receive other light than the light which has passed through the optical modulating section 920. When the aperture size of the diaphragm section 930 is larger than the first aperture size, the light receiving section 120 receives the light from the object part of which has not passed through the optical modulating section 920. Therefore, under the condition that the aperture size of the diaphragm section 930 is set larger than the first aperture size, the focusing control section 160 causes the light receiving section 120 to receive the light from the object while varying the positional relation between the in-focus position and the light receiving section 120. In this manner, the focusing control section 160 performs the focusing control with reference to the quantity of the light received by the light receiving section 120. While the focusing control section 160 maintains the object focused, the image capturing control section 180 captures the images of the object with the aperture size of the diaphragm section 930 being set equal to or lower than the first aperture size.

As mentioned earlier, the optical modulating section 920 generates a phase shift of $P(x, y)=\exp(j\alpha(x^3+y^3))$ in the phase of the light that passes through the optical modulating section 920. When the optical modulating section 920 having such a shape is used, the phase shift generated in the light passing through the predetermined region defined so as to include therein the optical axis is much smaller than the phase shift generated in the light passing through the peripheral region (for example, the regions indicated by the reference numerals 921 and 922 in FIG. 9). For example, the optical modulating section 920 only generates a slight phase shift in the light passing through the area 1000 of the optical modulating section 920. Therefore, when the quantity of the light from the object is large, the aperture size of the diaphragm section 930 is controlled so that the light passing through the area 1000 of the optical modulating section 920 passes along the edge of the diaphragm section 930 (this aperture size of the diaphragm section 930 is referred to as a second aperture size). In this manner, although the light from the object passes through the area 1000 of the optical modulating section 920 and then reaches the light receiving section 120, the light is only slightly phase-shifted by the optical modulating section 920 during the passage. Therefore, the focusing control can be performed by using the light that has passed through the area 1000 of the optical modulating section 920.

That is to say, the degree at which the light that passes through the first region of the optical modulating section 920 which includes therein the optical axis is modulated is smaller than the degree at which the light that passes through the second region of the optical modulating section 920 which is different from the first region is modulated. When the aperture size of the diaphragm section 930 is equal to or lower than the predetermined second aperture size, the light receiving section 120 receives the light from the object which has passed through the first region of the optical modulating section 920 (for example, the area 1000 of the optical modulating section 920), but does not receive the light which has passed through the second region of the optical modulating section 920 (for example, the region within the periphery 1020 except for the area 1000). When the aperture size of the diaphragm section 930 is larger than the second aperture size, the light receiving section 120 receives the light from the object which has passed through the second region of the optical modulating section 920. Here, when the light quantity detected by the light quantity detecting section 170 is larger than a predetermined value, the focusing control section 160 causes the light receiving section 120 to receive the light from the object while varying the positional relation between the in-focus position and the light receiving section 120, with the aperture size of the diaphragm section 930 being set equal to or lower than the second aperture size. Under this condition, the focusing control section 160 performs the focusing control with reference to the quantity of the light received by the light receiving section 120. While the focusing control section 160 maintains the object focused, the image capturing control section 180 captures the images of the object with the aperture size of the diaphragm section 930 being set larger than the second aperture size.

As described above, with the light from the object being controlled so as not to pass through the optical modulating section 920, the focusing control section 160 causes the light receiving section 120 to receive the light from the object while varying the positional relation between the in-focus position of the optical system 110 and the light receiving section 120. Under this condition, the focusing control section 160 performs the focusing control with reference to the quantity of the light received by the light receiving section 120. While the focusing control section 160 maintains the object focused, the image capturing control section 180 captures the images of the object by causing the light receiving section 120 to receive the light which has passed through the optical modulating section 920.

The image correcting section 140 may correct the images generated by the image generating section 130 in accordance with the aperture size of the diaphragm section 930 and the optical transfer function of the optical system 110 which is associated with this aperture size of the diaphragm section 930. The output section 150 may output the images generated by the image generating section 130 when the aperture size of the diaphragm section 930 is equal to or lower than a predetermined value (for example, the second aperture size), and may output the images obtained as a result of the correction done by the image correcting section 140 when the aperture size of the diaphragm section 122 is larger than the predetermined value (for example, the second aperture size). In the above description, the aperture size of the diaphragm section 930 is set larger than the first aperture size during the focusing control processing. The aperture size of the diaphragm section 930 may be set larger than the first aperture size when the image capturing apparatus 100 is tested, and set equal to or smaller than the first aperture size when the image capturing apparatus 100 is actually used.

Figure 11:
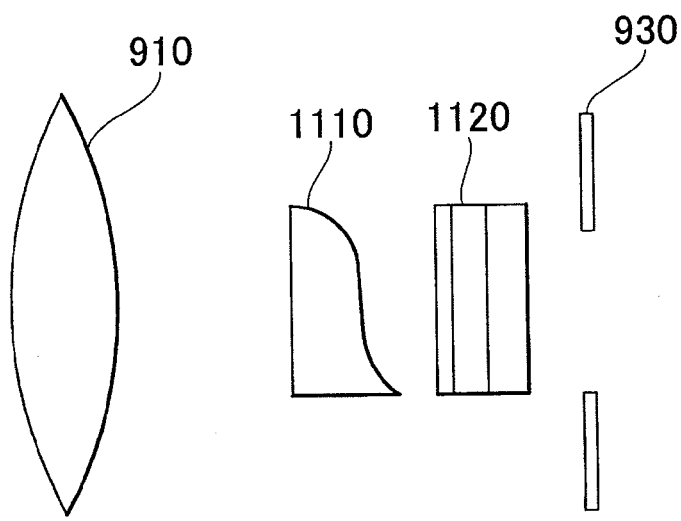
FIG. 11 illustrates a further different exemplary configuration of the optical system 110.

FIG. 11 illustrates a further different exemplary configuration of the optical system 110. According to the example shown in FIG. 11, the optical system 110 includes therein the lens 910, a first phase modulating section 1110, a second phase modulating section 1120, and the diaphragm section 930. The first and second phase modulating sections 1110 and 1120 function as the optical modulating section. Here, note that the optical modulating section 920 shown in FIG. 9 generates a phase shift in the x and y directions. On the other hand, each of the first and second phase modulating sections 1110 and 1120 generates a phase shift only in one direction. In one example, each of the first and second phase modulating sections 1110 and 1120 has a shape represented by $z=k(y^3)$. In this case, the first and second phase modulating sections 1110 and 1120 have substantially the same phase modulation characteristics.

As mentioned above, each of the first and second phase modulating sections 1110 and 1120 modulates, in a one-dimensional direction, the phase of the image of the object generated based on the light from the object. When the directions in which the first and second phase modulating sections 1110 and 1120 modulate the phase are substantially orthogonal to each other, the first and second phase modulating sections 1110 and 1120 cause the optical transfer function of light from an object to be substantially constant at the position where the light receiving section 120 is provided on condition that the object distance of the object falls within the predetermined range in the direction parallel to the optical axis. Consider a case where the first and second phase modulating sections 1110 and 1120 are originally oriented in such a manner as to generate a phase shift in the same direction and one of the first and second phase modulating sections 1110 and 1120 is then rotated by $\pi/2$ with respect to the optical axis. After the rotation, the first and second phase modulating sections 1110 and 1120 together generate a two-dimensional phase shift. When the rotated one of the first and second phase modulating sections 1110 and 1120 is further rotated by $\pi/2$ with respect to the optical axis, the respective phase shifts are generated in such directions as to offset each other. Which is to say, when the first and second phase modulating sections 1110 and 1120 are arranged so as to generate phase shifts in directions that are orthogonal to each other, the focal depth is increased and blurry images are obtained. On the other hand, when arranged so as to generate phase shifts in directions that are opposite to each other, the first and second phase modulating sections 1110 and 1120 hardly shift the phase as a whole. Therefore, the focusing control section 160 can perform the focusing control processing while the first and second phase modulating sections 1110 and 1120 are controlled so as to generate phase shifts in directions opposite to each other.

In other words, the focusing control section 160 causes the light receiving section 120 to receive the light from the object while varying the positional relation between the in-focus position and the light receiving section 120, under such a condition that the focusing control section 160 controls at least one of the directions in which the first and second phase modulating sections 1110 and 1120 modulate the phase so that the modulation made by the first phase modulating section 1110 is offset by the modulation made by the second phase modulating section 1120. Under this condition, the focusing control section 160 performs the focusing control with reference to the quantity of the light received by the light receiving section 120. While the focusing control section 160 maintains the object focused and controls the first and second phase modulating sections 1110 and 1120 so as to modulate the phase in directions that are substantially orthogonal to each other, the image capturing control section 180 captures the images of the object by causing the light receiving section 120 to receive the light which has passed through the first and second phase modulating sections 1110 and 1120.

As discussed above, the first phase modulating section 1110 modulates the phase of the image of the object generated based on the light from the object, so as to cause the optical transfer function of the light from the object to remain substantially constant at the position where the light receiving section 120 is provided on condition that the object distance of the object falls within the predetermined range in the direction parallel to the optical axis. The second phase modulating section 1120 generates a phase shift in the direction that is substantially opposite to the direction in which the first phase modulating section 1110 generates a phase shift, to modulate the phase of the image of the object in such a direction as to offset the modulation made by the first phase modulating section 1110. With the first and second phase modulating sections 1110 and 1120 being controlled so as to modulate the image of the object, the focusing control section 160 causes the light receiving section 120 to receive the light from the object while varying the positional relation between the in-focus position and the light receiving section 120. Under this condition, the focusing control section 160 performs the focusing control with reference to the quantity of the light received by the light receiving section 120. When the image capturing control section 180 captures the images of the object, the focusing control section 160 maintains the object focused, the light from the object passes through the first phase modulating section 1110 and is then received by the light receiving section 120, and the light which has passed through the second phase modulating section 1120 is not received by the light receiving section 120.

FIG. 12 illustrates a further different exemplary configuration of the optical system 110. According to the example shown in FIG. 12, the optical system 110 includes therein the lens 910, an optical modulating section 1220, and the diaphragm section 930. The lens 910 and diaphragm section 930 relating to this example respectively have substantially the same functions as the lens 910 and the diaphragm section 930 described with reference to FIG. 9, and therefore not explained here. The optical modulating section 1220 has substantially the same optical characteristics as the optical modulating section 920, except that the optical modulating section 1220 has different optical characteristics from the optical modulating section 920 in the vicinity of the optical axis. The following only describes the difference between the optical modulating sections 920 and 1220.

The optical modulating section 1220 does not modulate the phase of the light which passes through a region other than the peripheral region (for example, the regions indicated by the reference numerals 921 and 922). Note that the peripheral region of the optical modulating section 1220 has a shape represented by $z=k(x^3+y^3)$, similarly to the optical modulating section 920. Therefore, the optical modulating section 1220 shifts the phase of the light similarly to the optical modulating section 920. As explained in the above, the optical modulating section 1220 substantially does not modulate the light which passes through a predetermined region of the optical modulating section 1220 including the optical axis, but modulates the light which passes through a different region of the optical modulating section 1220 than the predetermined region including the optical axis. Which is to say, when the aperture size of the diaphragm section 930 is adjusted such that no light passes through the peripheral region of the optical modulating section 1220, the phase of the light from the object is not modulated before the light is received by the light receiving section 120. Here, note that the light which passes through the region in the vicinity of the optical axis has a larger depth of field than the light which passes through the peripheral region. Therefore, the image capturing apparatus 100 can obtain in-focus images.

On the other hand, when the aperture size of the diaphragm section 930 is adjusted such that light passes through the peripheral region of the optical modulating section 1220, the phase of the light from the object is modulated before the light is received by the light receiving section 120. In this case, the optical transfer function in the entire optical system 110 is substantially not determined by the object distance. For this reason, the depth of field can be increased independently from the aperture size also in the optical system 110 shown in FIG. 12. With the optical system 110 shown in FIG. 12, for example, when sufficient brightness is provided and the aperture size of the diaphragm section 930 can be adjusted such that no light passes through the peripheral region of the optical modulating section 1220, the image capturing apparatus 100 does not need to perform the image restoration processing, thereby outputting the images swiftly.

FIG. 13 illustrates a further different exemplary configuration of the optical system 110. According to the example shown in FIG. 13, the optical system 110 includes therein a lens 1310 and the diaphragm section 930. The diaphragm section 930 relating to the present example has substantially the same function as the diaphragm section 930 described with reference to FIG. 9, and thus not explained there. In the optical system 110 having the configuration illustrated in FIG. 13, the lens 1310 has the optical modulating section similarly to the optical system 110 described with reference to FIGS. 2 to 6.

The lens 1310 does not modulate the phase of the light which passes through the region other than the peripheral region (for example, the regions indicated by the reference numerals 1311 and 1322). The peripheral region of the lens 1310 has such a shape as to shift the phase of the light in a similar manner to the optical modulating section 1220. As explained in the above, the lens 1310 does not modulate the light which passes through the predetermined region of the lens 1310 including the optical axis, but modulates the light which passes through a different region of the lens 1310 from the predetermined region. Which is to say, when the aperture size of the diaphragm section 930 is adjusted such that no light passes through the peripheral region of the lens 1310, the phase of the light from the object is not modulated before the light is received by the light receiving section 120. Here, note that the light which passes through the region in the vicinity of the optical axis has a larger depth of field than the light which passes through the peripheral region. Therefore, the image capturing apparatus 100 can obtain in-focus images.

On the other hand, when the aperture size of the diaphragm section 930 is adjusted such that the light passes through the peripheral region of the lens 1310, the phase of the light from the object is modulated before the light is received by the light receiving section 120. In this case, the optical transfer function of the optical system 110 is substantially not determined by the object distance. For this reason, the depth of field can be increased independently from the aperture size also in the optical system 110 shown in FIG. 13.

FIG. 14 illustrates, as an example, the data stored on the correction parameter storing section 145 by using a table. The correction parameter storing section 145 stores thereon an inverse filter, which is shown as an example of the correction parameter, in association with each aperture size. As illustrated in FIG. 14, the correction parameter storing section 145 stores thereon, in association with an aperture size 2 that is larger than an aperture size 1, an inverse filter A determined by the response of the optical transfer function of the optical system 110 which is observed when the aperture size of the diaphragm section 122 is set at the aperture size 2. The correction parameter storing section 145 stores thereon, in association with an aperture size 3 that is different from the aperture size 2, an inverse filter B determined by the response of the optical transfer function of the optical system 110 which is observed when the aperture size of the diaphragm section 122 is set at the aperture size 3.

The image correcting section 140 acquires, from the image capturing control section 180, a control value used to control the aperture size of the diaphragm section 122 while the light receiving section 120 receives the light from the object. The image correcting section 140 selects the inverse filter which is stored on the correction parameter storing section 145 in association with the aperture size indicated by the acquired control value. The image correcting section 140 then uses the selected inverse filter to correct the image generated by the image generating section 130. In this manner, the image correcting section 140 can perform the image restoration processing in accordance with the aperture size. As a result, the image capturing apparatus 100 does not need to set the upper limit value on the aperture size considering the depth of field, and can instead freely set the aperture size with reference to parameters such as the brightness and the exposure time.

When the aperture size of the diaphragm section 122 is set equal to or smaller than an aperture size 1 that is smaller than the aperture sizes 2 and 3, the light from the object is not modulated by the phase modulating section, or is substantially not modulated by the phase modulating section. If such occurs, the image correcting section 140 does not correct the image. For this reason, the correction parameter storing section 145 is not required to store thereon the correction parameter to correct the optical transfer function of the optical system 110 in association with the aperture size 1.

FIG. 15 illustrates, as an example, the data stored on the focal length storing section 190 by using a table. In the optical system 110 described with reference to FIG. 15, the optical transfer function of light from an object remains substantially constant at the position where the light receiving section 120 is provided on condition that the object distance of the object falls within a plurality of predetermined ranges in the direction parallel to the optical axis. In the optical system 110, an additional optical element such as the optical modulating section 920 may cause the optical transfer function of the light from the object to remain substantially constant on condition that the object distance of the object falls within the plurality of ranges. Alternatively, as described with reference to FIGS. 2 to 7, the optical system 110 itself may be designed such that the optical transfer function of the light from the object remains substantially constant on condition that the object distance of the object falls within the plurality of ranges. In either way, the optical system 110 or additional optical element can be designed based on the designated plurality of ranges for the object distance, so as to meet the requirement that the optical transfer function of the light from the object remains substantially constant on condition that the object distance of the object falls within the designated ranges.

The focal length storing section 190 stores thereon, in association with each focal length, a plurality of ranges for the distance, where the optical transfer function of the light from the object remains substantially constant on condition that the object distance of the object falls within the plurality of ranges. Here, the distance may indicate the distance from the principal point of the optical system 110 to the object. The distance obtaining section 192 obtains the distance from the optical system 110 to each of a plurality of subjects which are positioned differently in the direction parallel to the optical axis relative to the optical system 110. The distance obtaining section 192 may be a distance measuring sensor, for example. Alternatively, the distance obtaining section 192 may obtain the distance from the optical system 110 to each of the plurality of subjects at different positions, by referring to the focusing control information provided by the focusing control section 160 described in the earlier section.

As illustrated in FIG. 15, the focal length storing section 190 stores thereon, in association with each focal length of the optical system 110, a plurality of ranges for the object distance, where the optical modulating section can cause the optical transfer function of the light from the object to remain substantially constant on condition that the object distance of the object falls within the plurality of ranges. The focal length identifying section 194 identifies the focal length which is stored on the focal length storing section 190 in association with the distance range that includes therein the distances from the optical system 110 to the plurality of subjects which are obtained by the distance obtaining section 192. The image capturing control section 180 controls the focal length of the light receiving section 120 so as to be equal to the focal length identified by the focal length identifying section 194, and then causes the light receiving section 120 to receive the light from the object. By performing the above-described control, the image capturing apparatus 100 can position the main object within such a range of the object distance that the image restoration processing using an inverse filter can produce images having as few errors as possible even when using the optical system 110 which has increased focal depth.

The optical modulating section causes the optical transfer function of the light from the object to have an absolute value larger than a predetermined value and remain substantially constant on condition that the object distance of the object falls within a plurality of ranges. To achieve such characteristics for the absolute value of the optical transfer function, the absolute value of the optical transfer function is limited when the optical system 110 is designed. The image generating section 130 generates the images of the object based on the quantity of the light received by the light receiving section 120 while the focal length of the light receiving section 120 is controlled to be equal to the focal length identified by the focal length identifying section 194. The image correcting section 140 corrects the images generated by the image generating section 130 with reference to the substantially constant optical transfer function. The output section 150 may output to the outside the image obtained as a result of the correction done by the image correcting section 140.

Note that the image generating section 130 generates the images of the object with reference to the quantity of the light received by the light receiving section 120 while the focal length of the light receiving section 120 is controlled to be equal to the focal length identified by the focal length identifying section 194. The output section 150 may display thereon the images generated by the image generating section 130. According to the above description, the focal length is controlled so that the distances from the optical system 110 to a plurality of specific subjects fall within the ranges for the object distance which enable the image restoration processing to produce images having as small blurring as possible and as few errors as possible. However, it is also possible to control the focal length so that the distances to a plurality of subjects other than the specific subjects fall within a range of the object distance which causes the image restoration processing to produce images having as large burring as possible.

Figure 16:
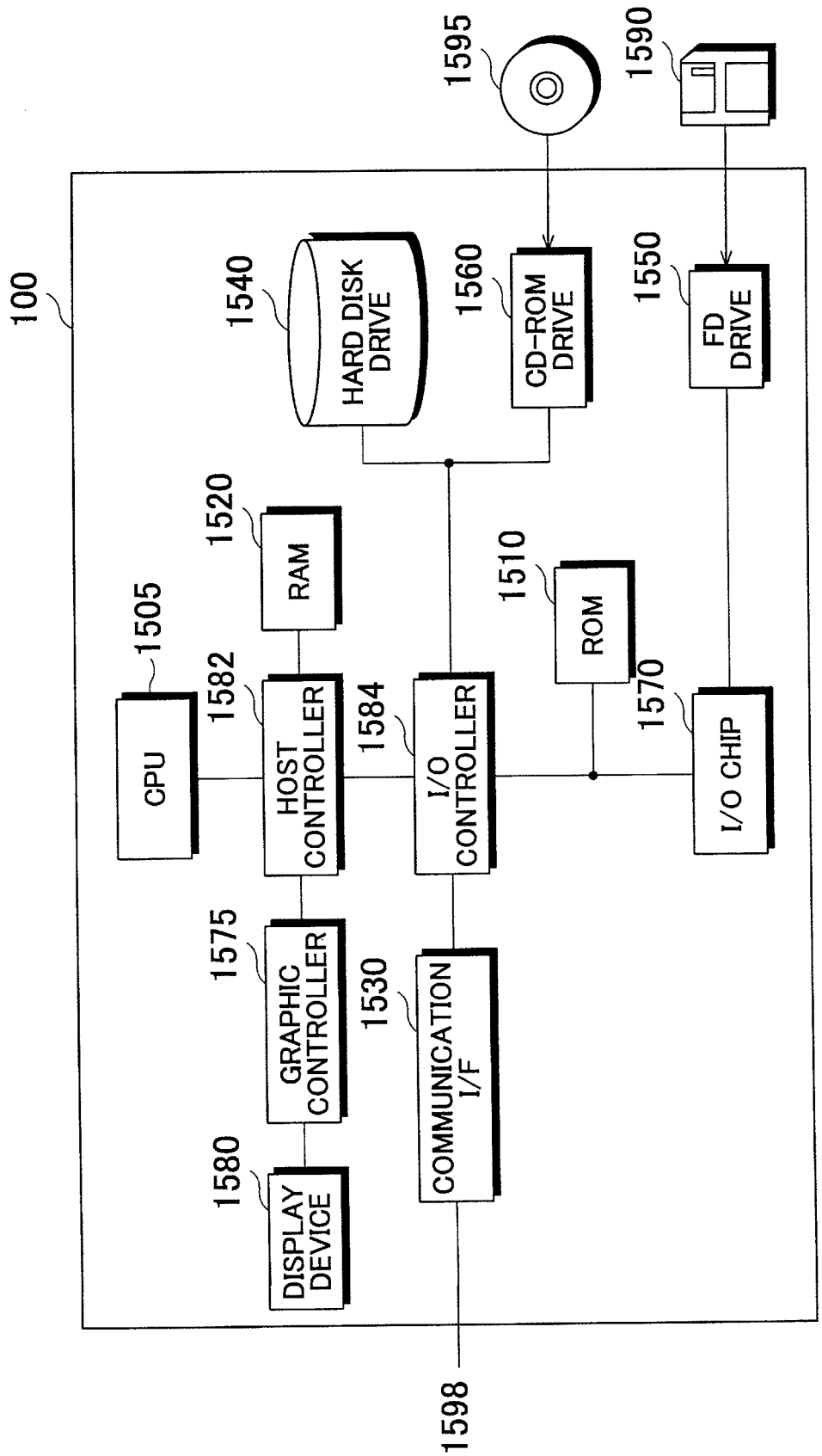
FIG. 16 illustrates an exemplary hardware configuration of a computer 1500 relating to the image capturing apparatus 100.

FIG. 16 illustrates an exemplary hardware configuration of the image capturing apparatus 100. The image capturing apparatus 100 is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the hard disk drive 1540, communication interface 1530 and CD-ROM drive 1560 which are I/O devices operating at a relatively high rate. The hard disk drive 1540 stores thereon programs and data to be used by the CPU 1505. The communication interface 1530 is connected to a network communication apparatus 1598 to transmit/receive programs or data. The CD-ROM drive 1560 reads programs or data from a CD-ROM 1595, and supplies the read programs or data to the hard disk drive 1540 and communication interface 1530 via the RAM 1520.

The I/O controller 1584 is also connected to the ROM 1510, flexible disk drive 1550 and I/O chip 1570 which are I/O devices operating at a relatively low rate. The ROM 1510 stores thereon a boot program executed by the image capturing apparatus 100 at the start up, programs unique to the hardware of the image capturing apparatus 100, and the like. The flexible disk drive 1550 reads programs or data from a flexible disk 1590, and supplies the read programs or data to the hard disk drive 1540 and communication interface 1530 via the RAM 1520. The I/O chip 1570 is used to connect a variety of I/O devices such as the flexible disk drive 1550 via, for example, a parallel port, a serial port, a keyboard port, a mouse port or the like.

Programs to be executed by the CPU 1505 are provided by a user in a state of being stored on a recording medium such as the flexible disk 1590, CD-ROM 1595 and an IC card. The programs may be stored on the recording medium in the state of being compressed or not compressed. The programs are read from the recording medium, installed in the hard disk drive 1540, read onto the RAM 1520 and executed by the CPU 1505.

The programs to be executed by the CPU 1505 cause the image capturing apparatus 100 to function as the image generating section 130, the image correcting section 140, the correction parameter storing section 145, the output section 150, the focusing control section 160, the light quantity detecting section 170, the image capturing control section 180, the focal length storing section 190, the distance obtaining section 192 and the focal length identifying section 194 described with reference to FIGS. 1 to 15.

The programs mentioned above may be stored on an external recording medium. The recording medium is, for example, an optical recording medium such as DVD and PD, a magnet-optical recording medium such as MD, a tape medium, a semiconductor memory such as an IC card and the like, in addition to the flexible disk 1590 and CD-ROM 1595. The recording medium may be a storage device such as a hard disk and RAM which is provided in a server system connected to a dedicated communication network or the Internet, and the programs may be provided to the image capturing apparatus 100 via the network.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiments added with such alternations or improvements can be included in the technical scope of the invention.

What is claimed is:

1. An image capturing apparatus comprising:
   a light receiving section that receives light from an object;
   an optical system that passes the light from the object therethrough so as to cause the light receiving section to receive the light from the object, the optical system including an optical modulating section which causes an optical transfer function of the light from the object to remain substantially constant at a position where the light receiving section is provided on condition that an object distance of the object falls within a predetermined range in a direction parallel to an optical axis of the optical system;
   a diaphragm section that blocks at least partially the light from the object to be received by the light receiving section;
   a light quantity detecting section that detects a quantity of the light from the object; and
   an image capturing control section that, when the light quantity detected by the light quantity detecting section is smaller than a predetermined light quantity, (i) sets an aperture size of the diaphragm section so as to be larger than a predetermined value and (ii) causes the light receiving section to receive the light from the object at least part of which is modulated by the optical modulating section, wherein the optical modulating section is movable relative to the optical axis of the optical system, and
when the light quantity detected by the light quantity detecting section is smaller than the predetermined light quantity, the image capturing control section (i) sets the aperture size of the diaphragm section so as to be larger than the predetermined value and (ii) moves the optical modulating section to a position which enables the light receiving section to receive the light from the object at least part of which has passed through the optical modulating section.

2. The image capturing apparatus as set forth in claim 1, wherein
   when the aperture size of the diaphragm section is larger than the predetermined value, the optical modulating section is positioned such that the light from the object passes through the optical modulating section.

3. The image capturing apparatus as set forth in claim 1, wherein
   a modulation degree at which light is modulated when passing through a predetermined region of the optical modulating section which includes therein the optical axis is smaller than a modulation degree at which light is modulated when passing through a different region of the optical modulating section than the predetermined region.

4. The image capturing apparatus as set forth in claim 3, wherein
   a modulation degree at which light that is incident on an entrance pupil of the optical system at an incident position which is distant from the optical axis by a distance longer than a first distance is modulated when passing through the optical modulating section is larger than a modulation degree at which light that is incident on the entrance pupil of the optical system at an incident position somewhere from the optical axis to a first incident position which is distant from the optical axis by the first distance is modulated when passing through the optical modulating section.

5. The image capturing apparatus as set forth in claim 4, wherein
   an incident position positioned on the entrance pupil of the optical system and a transverse aberration for a light ray that is incident on the optical system at the incident position and passes through the optical modulating section are related to each other such that an absolute value of the transverse aberration increases as a distance from the optical axis to the incident position increases, when the incident position is somewhere from the first incident position that is distant from the optical axis by the first distance to a second incident position that is distant from the optical axis by a second distance larger than the first distance.

6. The image capturing apparatus as set forth in claim 5, wherein
   a differential value of a transverse aberration associated with an incident position in a vicinity of the second incident position is zero.

7. The image capturing apparatus as set forth in claim 6, wherein
   when the incident position is somewhere from the second incident position to a third incident position that is distant from the optical axis by a third distance longer than the second distance, the absolute value of the transverse aberration decreases as the distance from the optical axis to the incident position increases.

8. The image capturing apparatus as set forth in claim 7, wherein
a transverse aberration associated with a light ray that is incident on the optical system at the third incident position is zero.

9. The image capturing apparatus as set forth in claim 8, wherein
when the incident position is somewhere from the third incident position to a fourth incident position that is distant from the optical axis by a fourth distance longer than the third distance, the absolute value of the transverse aberration increases as the distance from the optical axis to the incident position increases.

10. The image capturing apparatus as set forth in claim 3, further comprising:
an image generating section that generates an image of the object based on the quantity of the light received by the light receiving section; and
an image correcting section that corrects the image generated by the image generating section with reference to (i) the aperture size of the diaphragm section and (ii) an optical transfer function of the optical system which is associated with the aperture size of the diaphragm section.

11. The image capturing apparatus as set forth in claim 10, wherein
the image capturing control section increases the aperture size of the diaphragm section as the light quantity detected by the light quantity detecting section decreases.

12. The image capturing apparatus as set forth in claim 11, further comprising
a correction parameter storing section that stores thereon, in association with each aperture size of the diaphragm section, a correction parameter determined by an optical transfer function of the optical system which is associated with the each aperture size of the diaphragm section, wherein
the image correcting section corrects the image generated by the image generating section by using a correction parameter which is stored on the correction parameter storing section in association with the aperture size of the diaphragm section which is controlled by the image capturing control section.

13. The image capturing apparatus as set forth in claim 10, further comprising
an output section that outputs the image generated by the image generating section when the aperture size of the diaphragm section is equal to or lower than a predetermined value, and outputs an image obtained by the correction done by the image correcting section when the aperture size of the diaphragm section is larger than the predetermined value.

14. The image capturing apparatus as set forth in claim 3, wherein
the optical modulating section substantially does not modulate the light that passes through the predetermined region of the optical modulating section which includes the optical axis and modulates the light that passes through the different region of the optical modulating section than the predetermined region.

15. The image capturing apparatus as set forth in claim 3, wherein
the optical modulating section increases a modulation degree at which light that passes through the optical modulating section is modulated as a distance from the optical axis to a region through which the light passes increases.

16. An image capturing method used by an image capturing apparatus, wherein
the image capturing apparatus comprises:
a light receiving section that receives light from an object;
an optical system that passes the light from the object therethrough so as to cause the light receiving section to receive the light from the object, the optical system including an optical modulating section which causes an optical transfer function of the light from the object to remain substantially constant at a position where the light receiving section is provided on condition that an object distance of the object falls within a predetermined range in a direction parallel to an optical axis of the optical system; and
a diaphragm section that blocks at least partially the light from the object to be received by the light receiving section, and
the image capturing method comprises:
detecting a quantity of the light from the object; and
when the light quantity detected in the light quantity detecting is smaller than a predetermined light quantity, (i) setting an aperture size of the diaphragm section so as to be larger than a predetermined value and (ii) causing the light receiving section to receive the light from the object at least part of which is modulated by the optical modulating section, wherein
the optical modulating section is movable relative to the optical axis of the optical system, and
when the light quantity detected by the light quantity detecting step is smaller than the predetermined light quantity, the image capturing control section (i) sets the aperture size of the diaphragm section so as to be larger than the predetermined value and (ii) moves the optical modulating section to a position which enables the light receiving section to receive the light from the object at least part of which has passed through the optical modulating section.

17. A non-transitory computer readable medium storing thereon a program for use with an image capturing apparatus, the image capturing apparatus comprises:
a light receiving section that receives light from an object;
an optical system that passes the light from the object therethrough so as to cause the light receiving section to receive the light from the object, the optical system including an optical modulating section which causes an optical transfer function of the light from the object to remain substantially constant at a position where the light receiving section is provided on condition that an object distance of the object falls within a predetermined range in a direction parallel to an optical axis of the optical system; and
a diaphragm section that blocks at least partially the light from the object to be received by the light receiving section; wherein
the program causes the image capturing apparatus to function as:
a light quantity detecting section that detects a quantity of the light from the object; and
an image capturing control section that, when the light quantity detected by the light quantity detecting section is smaller than a predetermined light quantity, (i) sets an aperture size of the diaphragm section so as to be larger than a predetermined value and (ii) causes the light receiving section to receive the light from the object at least part of which is modulated by the optical modulating section, wherein the optical modulating section is movable relative to the optical axis of the optical system, and when the light quantity detected by the light quantity detecting section is smaller than the predetermined light quantity, the image capturing control section (i) sets the aperture size of the diaphragm section so as to be larger than the predetermined value and (ii) moves the optical modulating section to a position which enables the light receiving section to receive the light from the object at least part of which has passed through the optical modulating section.

* * * * *